Figures 1, 1A, 1B, 2:
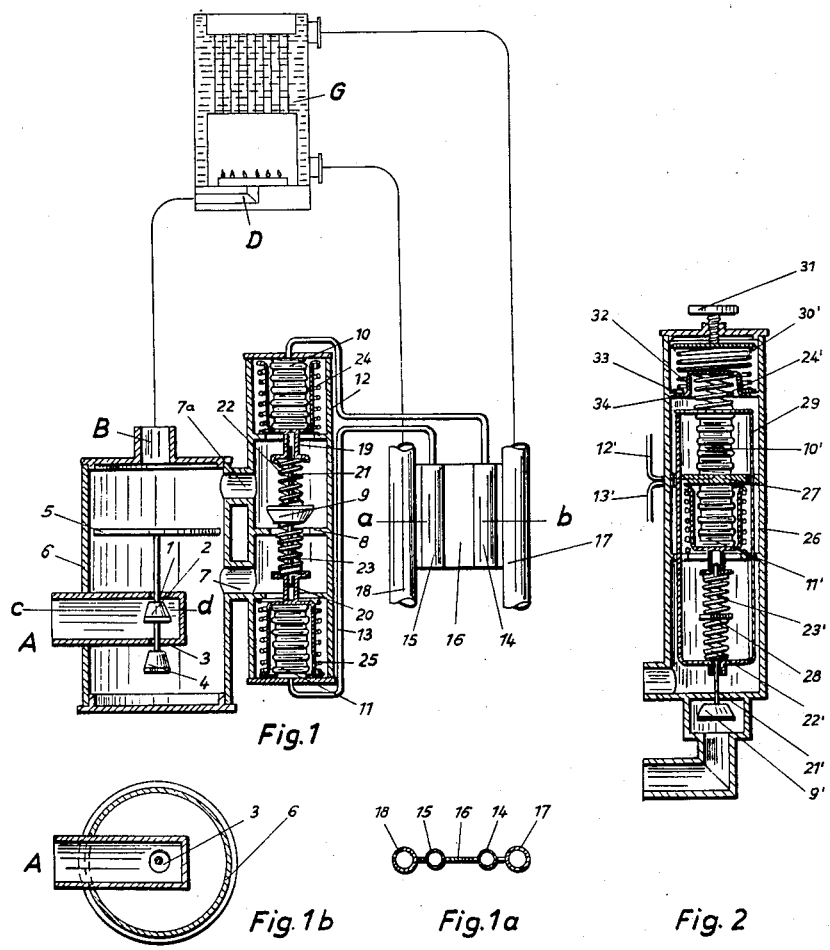

Dec. 22, 1953  W. BRÜMMERHOFF  2,663,501
DEVICE FOR CONTROLLING THE FUEL SUPPLY OF HEATING PLANTS
FIRED WITH GASEOUS OR LIQUID FUELS, PARTICULARLY
GAS-FIRED LIQUID HEATERS
Filed June 28, 1951

Patented Dec. 22, 1953

2,663,501

UNITED STATES PATENT OFFICE 2,663,501

DEVICE FOR CONTROLLING THE FUEL SUPPLY OF HEATING PLANTS FIRED WITH GASEOUS OR LIQUID FUELS, PARTICULARLY GAS-FIRED LIQUID HEATERS

Walter Brümmerhoff, Remscheid-Lennep, Germany, assignor to Johann Vaillant Kommanditgesellschaft, Remscheid, Germany Application June 28, 1951, Serial No. 234,114

7 Claims. (Cl. 236—91)

This invention relates to and has for its object to provide a control device for heating plants, fired with gaseous or liquid fuels, in which the fuel supply is so controlled that the heat released by the combustion of the fuel effects a constant heat output of the heater.

The present invention contemplates primarily to provide an efficient control device for controlling the heat output of heating plants, particularly liquid heaters.

In order to explain the invention further a preferred embodiment thereof as applied to a gas-fired hot water boiler will now be described by way of example. With constant gas pressure the heat output of a gas-fired heater is determined by the heat supplied by the gaseous fuel which, depending upon the thermal value or density of the gas, may vary. Since the heat output is the product of the difference of temperature between water inlet and water outlet a change of the heat supply can manifest itself either, with a constant quantity of water, in a change of the difference of temperature, or, with a constant difference of temperature in a change of the quantity of water. Accordingly, a control of the heat output could be accomplished in such a manner that either the quantity of water, or the difference of temperature is maintained at a constant value, or the other value is employed for the control of the gas valve in the gas supply pipe. However, there are two controls requisite in such a kind of heat output regulation, namely, a water regulator and a temperature regulator. Moreover, it can be employed only when sufficiently strong forces in the stream of water are available for the control of the water quantity regulator, or of a gas valve. This is, however, not always the case, for example, in hot water boilers serving for the operation of a gravity heating plant, because in such a heating plant there are available for the circulation of the hot water at any rate only the small raising forces of the hot water as compared with the cold water.

In accordance with the invention this problem has found its solution by the employment of heat output regulators, in which a thermostat on the cold water supply pipe is conductively connected with a thermostat on the hot water pipe, and the expansion bodies of these thermostats are so arranged that the differential force of their heat stresses acts upon a throttle member situated in the gas supply pipe to the burner. The temperature in such an arrangement of thermostats depends upon the flow of heat which takes place in the heat-conductive connection. If the heat-conductive connection is so formed that there exists a considerable thermal conductivity between each of the thermostats and the walls of the cold and hot water pipes respectively and a substantially lower thermal conductivity between both thermostats, the difference of temperature of the thermostats is also affected by the velocity of the water. Along with this the temperature of the thermostats comes the closer to the temperature of the water in the hot and cold water pipes respectively, the higher the velocity of the water, consequently the greater the quantity of water. The heat-conductive connection is so proportioned and its thermal conductivity so chosen that the differential of expansion of the expansion members remains equal. The throttle member is then so arranged that the forces are neutralized and the throttle member is not moved. This is preferably so effected that the throttle member is arranged co-axially with the expansion members and that it is on both sides in connection with them by means of a spring of equal tension. With increasing or decreasing output the difference of temperature decreases also, it being all the same whether the amount of water, or the difference of temperature of the water, or both will change simultaneously. A change of the difference of temperature between the thermostats is attended by the effect that the stresses, as applied to the position of the throttle member, do not neutralize each other anymore. The throttle member regulates, therefore, the passage of the gas so long until the output has reached its original quantity. In order that the quantity of gas, set by the throttle member, is rendered independently of the gas pressure in the supply pipe, the throttle member is preferably arranged in the gas circulation duct of a differential pressure regulator for the gas. The employment of a differential pressure regulator secures the advantage that the amount of gas flowing to the burner is independent of the burner temperature. If a burner pressure regulator were used too much gas would flow to the burner, as it is still cold, at the commencement of burner operations, because the burner is set to full output in its working condition, hence in its hot condition, and the gas being warmed before its escape through the burner orifices having, as applied to the volume unit, a lower thermal value than it has as the burner is still cold.

The thermostats may also be partly filled with a liquid of low boiling point, and each expansion body be put under the tension of a spring which takes up the counterforce of the expansion body exerted by the vapor pressure of the filling liquid. In addition, the particular thermostat which is in connection with the hot water pipe is put under the tension of a second spring which is connected in series to the first spring and compressed only when a given settable pressure is exceeded. As this pressure, which corresponds to a definite water temperature, is reached, the stroke characteristic of the expansion body will be changed by this additional spring in a manner whereby the gas valve is more rapidly closed at a further rise of temperature, thereby effecting a reduction of the gas supply until the temperature does not exceed the set value.

In the drawings affixed to this specification and forming part thereof two forms of output regulators, in which the invention is embodied, are illustrated diagrammatically by way of example. In the drawings:

Fig. 1 is a sectional elevation of one form of the invention, showing the output regulator without inlet water temperature control, Fig. 1a is a detail section taken on the line a—b of Fig. 1, showing the heat-conductive connection, Fig. 1b is a sectional view taken in the plane of the line c—d in Fig. 1, Fig. 2 is a sectional elevation of another form of the invention, showing the output regulator with temperature control.

In the form of the invention according to Fig. 1 the gas enters at A, and passes through the free passage between seat 1 and control member 2 respectively seat 3 and control member 4 into the chamber below a disk 5 floating in the gas stream, where it is divided into two streams one of which passing through the annular gap between disk 5 and housing 6 and the other one through duct 7, free passage between seat 8 and throttle member 9, and duct 7a. Both streams unite in the space above the disk 5 and thence are conveyed through a connection B to the burner D of a hot water boiler G. Coaxially mounted with the throttle member 9 are expansion members 10 and 11 which are connected by means of capillary tubes 12, 13 with thermostats 14, 15 in a heat-conductive connection 16 between a hot water pipe 17 and a cold water pipe 18. The heat-conductive connection is so formed that its strip of Constantan or other metal having low heat conductivity is placed between the thermostats, whereas the cold water pipe 18 and the hot water pipe 17 respectively are connected to the thermostats 14, 15 by means of copper strips having high heat conductivity. Each expansion member is provided with a sleeve 19 respectively 20 serving as guide for a pin 21 which is rigidly secured to the throttle member 9. A spring 22 is arranged between the end face of the sleeve 19 and the throttle member 9 and likewise a spring 23 between the latter and the end face of the sleeve 20. These springs 22, 23 have the same tension and hold the throttle member 9 always in the center between the expansion members 10 and 11. Movement of the throttle member 9 is effected only when one of the expansion members (10, 11) expands at a greater rate than the other, and such a movement effects a corresponding change of the amount of gas flowing to the burner B. However, the pressure difference between the spaces above and below the disk 5 remains constant due to its corresponding adjustment.

In such cases where the thermostats 14, 15 are partially filled with a liquid having a low boiling point instead of an expansion liquid, the expansion members 10, 11 are put under the tension of a spring 24, 25 respectively for taking up the vapor pressure exerted by the liquid. Most desirably, the springs 24, 25 are so arranged that the gas stream is not forced to pass through the coils of the springs. The mode of action of the described arrangement is as follows. In the position of equilibrium shown on the drawing the burner D of the hot water boiler G is supplied with a certain amount of gas determined by the position of the valve 9 whereby the colder return water coming from the heating plant through the pipe 18 is warmed and conveyed again to the hot water inlet pipe 17.

A flow of heat takes place through the heat-conductive connection 16 which, on the one hand, depends upon the difference of temperature between inlet water and return water and, on the other hand, upon the velocity of the water, i. e., the quantity of water flowing through the pipes 17, 18. Hence it happens that a difference of temperature occurs on the thermostats which, naturally, is lower than the difference of temperature between inlet water and return water. It will now be noted that this difference of temperature between the thermostats 14, 15 constitutes a standard for indexing the output, i. e., the product of the quantity of water and the difference of temperature of the water. Naturally, this difference of temperature between the thermostats 14, 15 changes at constant velocity of the water (water quantity) when a change of temperature of the inlet and return water takes place. But it also changes when the velocity of the water (water quantity) increases or decreases at constant temperatures of the inlet and return water. The reason for this is that the flow of heat in the heat-conductive connection 16 changes, due to other heat transfer conditions, when the velocity of flow varies. The greater the velocity of flow, the closer the temperatures of the thermostats 14, 15 will come to that of the water in the lines 17, 18, so that the temperature difference between the thermostats 14, 15 will be increased with increasing velocity of flow and will be decreased with decreasing velocity of flow—notwithstanding the fact that the water temperatures do not change.

When, however, no matter what the cause may be, a change of the difference of temperature of the thermostats 14, 15 occurs, the equilibrium of forces existing on the valve 9 is disturbed and the latter is actuated in the sense of opening or closing by the tension exerted upon, or released by the springs 22, 23 by means of the expansion members 10, 11 until the difference of temperature between the thermostats 14, 15 is eliminated again.

In order to effect that also at varying gas pressures a certain position of the throttle member 9 corresponds to a certain quantity of gas, the differential pressure at the passage areas 1, 3, 8 is being held constant in known manner by means of the floating disk 5 and valves 2, 4.

In the construction according to this invention illustrated in Fig. 2 two expansion members 10' and 11' corresponding to expansion members 10 and 11 are arranged on a plate 27 which is rigidly secured within the casing 26, whereas the throttle member 9' is situated beyond the thermostatic arrangement. Also in this case displacement of the throttle member 9' takes place only when the differential of expansion between the members 10' and 11' has been changed. The expansion forces are transferred from the expansion members 10', 11' to a plate 28, on the one hand, by means of a bail 29 and a spring 22' and, on the other hand, by a similar spring 23', and said plate 28 is in connection with the throttle member 9' by means of a pin 21'. The expansion member 10', which is in connection with the thermostat 14 mounted on the hot water pipe 17, is under the tension of the springs 24' and 30' which are in series to each other. Up to a certain tension, which is settable by a screw 31, all expansion of the member 10' is taken up by the spring 24'. Only when that particular set spring tension, which corresponds to a certain hot water temperature, is reached, the spring 30' is also depressed further by means of a cap 32 which lifts a spring seat 33 from an annular support 34 provided for in the casing 26. The mode of action of the arrangement illustrated in Fig. 2 corresponds to that already described. However, when the temperature of the thermostat 14 exceeds a certain value, which is settable by the screw 31, the stroke of the respective expansion member 10' will become so great that the spring 24 overcomes the tension of the spring 30', set at 31, and lifts the cap 32 from its seat. In this condition the expansion member 10' is under the load of the springs 24', 30', which are in series to each other, and thus obtains a different stroke characteristic. This has the consequence that, within this range, the valve 9' is moved closer towards its seat and the supply of gas to the burner is throttled until the water temperature does not exceed the set value.

The invention is intended primarily for gas-fired liquid heaters, and provides an advantageous and efficient heat output regulator for this field of application. Moreover, the heat output regulator provided by the invention may also be employed in all other cases in which heat output regulators are already known which, however, do not possess the advantages of the present invention.

What is claimed is:

1. A device for controlling the fuel supply particularly for gas-fired liquid heaters comprising, a valve in the fuel supply pipe of the heater, a thermostat heat conductively connected with the pipe for the cold liquid, a second thermostat heat conductively connected with the pipe for the heated liquid, a heat-conductive connection between said thermostats, and means for changing the position of said fuel valve dependent upon the difference of temperature of said thermostats.

2. A device for controlling the fuel supply particularly for gas-fired liquid heaters comprising, a valve in the fuel supply pipe of the heater, a thermostat heat conductively connected with the pipe for the cold liquid, a second thermostat heat conductively connected with the pipe for the heated liquid, a heat-conductive connection between said thermostats, the heat conductivity of said connection being essentially lower than the heat conductivity of the connections between said thermostats and the associated liquid pipe, and means for changing the position of said fuel valve dependent upon the difference of temperature of said thermostats.

3. A device for controlling the fuel supply particularly for gas-fired liquid heaters comprising, a valve having an axially movable valve body in the fuel supply pipe of the heater, a thermostat heat conductively connected with the pipe for the cold liquid, a second thermostat heat conductively connected with the pipe for the heated liquid, a heat-conductive connection between said thermostats, one expansion body for each of said thermostats connected therewith, said expansion bodies arranged at both ends of said valve body and coaxial with it, and springs between said valve body and said expansion bodies.

4. A device for controlling the fuel supply particularly for gas-fired liquid heaters comprising, a valve having an axially movable valve body in the fuel supply pipe of the heater, a gas quantity regulator with throttle valve for maintaining a constant differential of pressure on said fuel valve, a thermostat heat conductively connected with the pipe for the cold liquid, a second thermostat heat conductively connected with the pipe for the heated liquid, a heat-conductive connection between said thermostats, the heat conductivity of said connection being essentially lower than the heat conductivity of the connections between said thermostat and the associated liquid pipe, one expansion body for each of said thermostats connected therewith, said expansion bodies arranged at both ends of said valve body and coaxial with it, and springs between said valve body and said expansion bodies.

5. A device for controlling the fuel supply particularly for gas-fired liquid heaters comprising, a valve having an axially movable valve body in the fuel supply pipe of the heater, a thermostat heat conductively connected with the pipe for the cold liquid, a second thermostat heat conductively connected with the pipe for the heated liquid, a heat-conductive connection between said thermostats, said thermostats being partially filled with a liquid that boils at a low temperature, one expansion body for each of said thermostats connected therewith, said expansion bodies arranged at both ends of said valve body and coaxially with it, compression springs which are effective upon said expansion bodies and take up the vapor pressure of the liquid, and springs between said valve body and said expansion bodies.

6. A device for controlling the fuel supply particularly for gas-fired liquid heaters comprising, a valve having an axially movable valve body in the fuel supply pipe of the heater, a thermostat heat conductively connected with the pipe for the cold liquid, a second thermostat heat conductively connected with the pipe for the heated liquid, a heat-conductive connection between said thermostats, said thermostats being partially filled with a liquid that boils at a low temperature, one expansion body for each of said thermostats connected therewith, said expansion bodies arranged at both ends of said valve body and coaxially with it, compression springs which are effective upon said expansion bodies and take up the vapor pressure of the liquid, hand operated means for setting said compression springs, and springs between said valve body and said expansion bodies.

7. A device for controlling the fuel supply particularly for gas-fired liquid heaters comprising, a valve having an axially movable valve body in the fuel supply pipe of the heater, a thermostat partially filled with a liquid of low boiling point heat conductively connected with the pipe for the cold liquid, said thermostat being in connection with a spring-loaded expansion body arranged coaxially with said valve body, a second thermostat partially filled with a liquid of low boiling point in heat-conductive connection with said first thermostat and with the pipe for the heated liquid, said second thermostat being connected with a second expansion body likewise coaxially arranged with said valve body, said second expansion body being under the tension of two springs arranged in series to each other, one of said springs being settable by hand-operated means and so arranged that it will be depressed only when the set spring pressure is reached, a resilient connection between said first expansion body and said valve body in such a manner that the latter moves in closing direction as said first expansion body expands, and a resilient connection between said second expansion body and said valve body in such a manner that said valve body moves in opening direction as said second expansion body expands.

WALTER BRÜMMERHOFF.

References Cited in the file of this patent
UNITED STATES PATENTS

| Number | Name | Date |
|---|---|---|
| 1,988,776 | Berghoefer | Jan. 22, 1935 |
| 2,115,431 | Shively | Apr. 26, 1938 |
| 2,296,325 | Bak | Sept. 22, 1942 |